United States Patent 3,403,118
Patented Sept. 24, 1968

3,403,118
FIRE RETARDANT COMPOSITIONS COMPRISING A POLYOLEFIN, ORGANIC BROMINE PHOSPHATE AND DISPERSANT
Gregory Julius Listner, Kendall Park, N.J., assignor to Johnson & Johnson, a corporation of New Jersey
No Drawing. Continuation-in-part of application Ser. No. 448,857, Apr. 16, 1965. This application June 14, 1966, Ser. No. 557,380
16 Claims. (Cl. 260—23)

ABSTRACT OF THE DISCLOSURE

The instant invention provides a polyolefin composition rendered flame retardant by a union of such polyolefin with an organic bromine phosphate.

---

This is a continuation-in-part of United States patent application Ser. No. 448,857, filed Apr. 16, 1965, now abandoned.

Flame retardancy has become a major specification consideration in industry for many plastic articles used in electronics and electrical applications as well as in many other industrial, commercial and household products. The polyolefins have been, and are being, considered in these areas and specifically in the textile area where filaments of these polymers with their many desirable chemical and physical properties offer much in specific end uses; however, the art has not been able to develop a satisfactory fire retardant additive or additives for polyolefins.

In selecting such an additive, care must be taken with respect to the properties of the resin, such as color, flexibility, tensile strength, electrical properties, softening point, etc. To date, the art has been unable to develop a suitable system which will impart fire retardancy to polyolefins without unsatisfactorily effecting some of the desirable properties of the resin.

The instant invention has overcome prior difficulties and provides a fire retardant polyolefin composition comprising a union of a polyolefin with a mixture of an organic bromine compound, and a dispersant for said compound where the organic bromine compound is dispersed substantially uniformly within said polyolefin composition.

By the term "dispersant" is meant a dispersing agent for promoting the formation and stabilization of a dispersion of one substance in another.

The dispersant is of extreme importance in this polymeric composition since it must be highly compatible with the organic bromine compound used, i.e., sufficiently compatible at extrusion temperatures to prevent separating out of ingredients, yet of sufficient compatibility in the system at end-use temperatures to preclude exudation or migration.

The dispersant is added to the system of this invention to rapidly and efficiently disperse the active ingredient, i.e., the organic bromine compound, substantially uniformly throughout the amorphous portion of the polymer without solvating the crystalline portion, or in any way inhibiting significant crystallization of the polymer. The dispersant used herein must accomplish these features, but must also be one which will permit the organic bromine compound to be absorbed by the amorphous portion of the polyolefin since the two are not known to be compatible or dispersible in one another. Thus, the dispersant must be compatible with both the polyolefin and the organic bromine compound used and it must readily disperse the organic bromine compound within the polyolefin. It must also have permanence which requires that it have a low vapor pressure and a low diffusion rate within the polyolefin.

Representative of the dispersants which are capable of satisfying all of these requirements are chlorinated polyphenyl compounds which define any of the biphenyl or triphenyl compounds containing from about 20% to about 70% by weight chlorine or blends of chlorinated biphenyls and triphenyls containing from about 20% to about 70% chlorine. Suitable examples of such chlorinated polyphenyl compounds are chlorinated biphenyl containing 60% by weight chlorine, chlorinated triphenyl containing 60% by weight chlorine and a blend of chlorinated triphenyl and chlorinated biphenyl containing 65% by weight chlorine, etc. Other acceptable dispersants that satisfy the demanding requirements recited herein are a chlorinated napthalene sold under the trademark "Halowax," stearic acid, chlorendic anhydride, and selected waxes, etc.

The dispersant must be present in the composition in amounts from about 0.05% to about 20% by weight, based on the total weight of the resultant polyolefinic composition, with 5% to 10% being preferred. The exact range will vary with the dispersant selected. For example, chlorinated biphenyl can be used in amounts of up to 20% without exudation, whereas with stearic acid exudation begins to occur at about 1% concentration and becomes prohibitive at greater than 4%. More than one dispersant may be added to the system but their combined amounts must fall within the limtis given above. Below about 0.05% there is insufficient dispersant present to perform the functions required of it and exudation of the organic bromo compound occurs on aging of the resin and extrusion can become erratic. The economics involved do not warrant amounts above about 20%. The degree of fire retardancy obtained at that level is more than sufficient. Also, incorporating larger amounts of dispersant in the polymer mix causes a diminution of the properties of the polyolefin.

With specific reference to a definition for the active fire retardant additive, i.e., the organic bromine compound, it has been found during the work performed developing the instant invention, that this fire retardant additive must (a) be resistant to water and weathering, (b) contain no water and be sufficiently low in vapor pressure so that it can be extruded without gasing, (c) have good thermal stability at the extrusion temperatures for the polyolefin used, (d) be capable of being made compatible with the polyolefin at extrusion and end-use temperatures so as not to separate or exudate from the polymer, (e) contain a high percentage of bromine so that a small amount of the additive will be effective, since the addition of any significant amount of additive would undoubtedly destroy or impair desirable polymer properties, and (f) be nonreactive with the base polyolefin polymer at extrusion temperatures yet be sufficiently reactive or unstable at ignition temperatures to extinguish a flame or impede combustion. This defines the organic bromine compounds which are the active ingredients, and thus the essential elements, in this invention. Representative examples of such compounds are "Phosgard" B52–RS, i.e.,

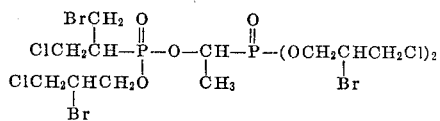

and Firemaster T23P, which is tris-2,3-dibromopropyl phosphate, i.e.,

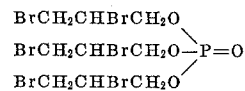

The organic bromine phosphates represent the preferred active fire retardant ingredients in this invention.

It is essential that the organic bromine compound impart fire resistance, but they must also have sufficient thermal stability, i.e., be substantially stable when held at a temperature of about 125° C. for a continuous period of about twenty-four hours, and be low enough in vapor pressure at about 400° F. to be extruded without gasing or reacting with the polyolefin in the extruder. It appears that once the bromine of the compound reacts with the polyolefin resin, many desirable properties of the polyolefin are lost.

Since the known organic bromine compounds which effect fire retardancy are not compatible with polyolefins, the incorporation of the specific dispersant(s) defined earlier, within the ranges set forth, is also essential. Without the use of this dispersant the possible concentrations of the fire retardant organic bromine compounds in the polyolefins are far below those necessary to impart the requisite flame retardancy to the resin, and the required uniform distribution is not insured.

With the polymeric composition of this invention in filament form, the fire retardant organic bromine compound must be present in amounts within the range of from about 3% to about 12% by weight, based on the total weight of the polyolefin resin composition and most preferably within the range of about 6% to about 10% with about 5% to about 7% elemental bromine concentrations present. At these levels a 12 ml. oriented monofilament extinguishes in less than one second after a three second ignition period. Below 3% there is insufficient present to provide the required fireproofing, and above about 12% problems regarding degrees of lack of compatibility begin to appear and polymeric breakdown will begin to be evidenced. If flammable pigments are present the lower limit given must be raised, and in that event a minimum of about 3.5% is acceptable. Preferably, the upper limit for the amount of organic bromine present is 12% by weight, based on the total weight, however, this is dependent on the methods, processing techniques and apparatus used for mixing. The system of this invention may contain up to 15% by weight, based on the total weight, of organic bromine compounds and thus up to about 10% elemental bromine; however, with the presence of between about 12% and 15% organic bromine, extreme care must be taken to insure that the mixing time and temperature are held within such limits as to insure that the organic bromine compound is not activated or made reactive during the mixing and extrusion of the polymer. If it were activated, the bromine would be liberated and noncompatible by-products would be developed.

The 3% to 12% organic bromine compound required is conditioned on the fact that the final poly-α-olefin composition has from at least greater than 2% elemental bromine to about 8%. With less than 2% there is insufficient elemental bromine present to effect the desired fire retardancy to the polyolefin resin and with above about 8% the resin is generally not extrudable. For use as a filament in fabric where both the warp and fill yarns contain the composition of this invention, the above limits are acceptable; however, in the event that only the warp or the fill yarns contain the fire retardant additive, or in the event that less than substantially all of the filaments of the essentially polyolefinic fabric contain this additive, the lower requirement for elemental bromine must be set at 5%.

If, on the other hand, the polyolefin is to be formed or shaped into other than a filament, i.e., if there is to be less surface per unit of mass exposed to oxygen, and if it thus becomes difficult to obtain a high mass temperature in the shaped article, the amount of organic bromine compound used is less although it must be present in amounts sufficient to satisfy all of the requirements recited earlier with respect to it. Loss of surface area is evidenced, for example, in a film or a molded article where there is less surface per unit of mass exposed to the air, and thus to oxygen, than there is for a filament. This inhibits combustion because less oxygen is available to support the combustion of the whole article. Additionally, in such a shaped article there is greater cross section than that normally in existence for a small filament and it thus becomes difficult to attain a high mass temperature, i.e., the temperature attained in the polymer on exposure to the heat, which is normally sufficient to initiate combustion, since once again there is less surface area exposed. Thus, the benefits of this invention are provided if there is as little as about 1% of organic bromine present in films of 5–7 mil thickness and in molded or other shaped article of at least that thickness.

In any event, and keeping within the ranges given above with reference to both filaments and other shaped articles, more than one organic bromine compound may be added, if desired, but the amount of both present in the polymer must be consistent with the limits set forth for the presence of one.

If it is desired that the filaments be colored, from about 0.1% to about 3%, based on the total weight of the composition of particulate inorganic pigment or carbon black, may be added to the system, i.e., either to the premix or to the extrudate. While quite generally all carbon blacks will work in this invention without seriously detracting from the fire retardancy created or other desirable properties of the polyolefin resin, it is essential that these be compatible in the system and that they do not themselves react with the other constituents or contain additives which so react. It is preferred, for best results, that a premix carbon black concentrate, i.e., a premix containing carbon black, a small amount of the resin it is to be mixed with, dispersants for the carbon black in the mixture, and a minor amount of other inerts be used for best results. Once again these too must be compatible with the system and must not react with the ingredients.

The extrusion stability of the mixture can be improved with the addition of as little as 0.05%, based on the weight of the total blend, of stearic acid. However, care must be taken that not more than about 4% is added since it tends to increase the flammability of the product at higher concentrations. It is preferred that from about 0.5% to about 1% be added; however, since stearic acid also functions as a dispersant, the requirements as to amounts present must be made consistent with those specified as to the dispersant, but in no event should there be greater than 4% stearic acid present, either in combination with another dispersant or alone. The stearic acid is found to be desirable in extrusion since it apparently keeps the screw clean and prevents reaction in the extruder due to catalyst from the extruder parts.

Although a mixture of the components recited, i.e., the organic bromine compound and the specific dispersant (with or without stearic acid) is extrudable, it does not have sufficient compatibility with the polyolefin to be surface-absorbed into pellets of the resin via a prebaking technique of 30 minutes to several hours in a 300° F. oven. Thus it is desirable that the polyolefin resin used be in flake or powdered form and that it be premixed by the method comprising (a) blending a mixture of particulate polyolefin resin, a dispersant, and an organic bromine compound in a suitable mixer, e.g., a Hobart reed mixer, to provide a blend sufficiently free flowing to feed through the extruder hopper and also feed uninterruptedly through the extruder. It is desirous that the blending be carried out at room temperature, i.e., at 80° F. or lower, and that both the resin and the additives be at 80° F. or lower prior to mixing to prevent complete wetting out of individual particles which would destroy free-flowing properties of the blend. The mixing time should be limited to only several minutes to prevent complete wetting of individual particles. The premix can, of course, be readily pelletized if desired.

Preferably a hot blending method of mixing is utilized whereby the polyolefin resin is heated to a temperature within the range of from about 125° F. to 200° F. The organic bromine compound, the dispersant and any other additives are heated together separate from the polyolefin but at a temperature within the 125° F. to 200° F. range. The additives are added to the resin and the composite is mixed thoroughly to distribute the additives substantially uniformly throughout the resin and allow uniform absorbency of the additives into the resin. The resultant mixture is free flowing and makes an excellent feed for extrusion or other shaping procedures.

The blend is extruded at a temperature within the range of from about 350° F. to about 475° F. Below 350° viscosities are too high for good processing and above 475° polymer breakdown occurs due to the high reaction. Below 350° the viscosity is too high for good extrusion and the results are also generally unrewarding because liquid penetration or absorption into the polymer is almost entirely through the amorphous areas in the polymer and there is insufficient amorphisity in the polyolefin below this temperature. The heat applied to the polyolefins should be in amounts sufficiently below the melting point of the particular polymer to insure the maintenance of the particulate state of the resin and thereby insure the free-flowing nature of this intermediate composition which facilitates ease of handling, etc., through the processing steps which will follow in providing the finished product.

The addition of the dispersant permits rapid and complete diffusion of the particles of the active fire retardant organic bromine compound and effects rapid dispersion of this active ingredient uniformly throughout the polymer mass, thereby producing a uniform product.

In adding the dispersant to the organic bromine compound, these constituents are mixed sufficiently to provide a substantially homogenous mixture.

This mixture is then combined with the particulate polyolefin and the constituents are again thoroughly mixed to insure substantially uniform distribution of the constituents throughout the composite. It is very important in this latter mixing that the constituents be dispersed to provide a resultant resin blend which will insure extrusion of a uniform polymer such that areas within the polymer will not differ from adjacent or other polymer areas in chemical or physical properties; however, it is equally important that over-mixing is not practiced, if cold blending is utilized, since this would wet the individual particles of polypropylene and thus reduce the free-flowing property of the resin blend. If hot blending is practiced, it is equally as important that the ingredients be thoroughly mixed to insure even distribution and absorption of the additives into the polymer to insure uniform fire retardant properties. Such practices also insure a good free-flowing feed to the extruder to achieve a uniform extrusion without feed interruption as a result of bridging in the hopper.

Extrusion is carried out at about 400° F. although an acceptable temperature range is established between about 375° F. and about 475° F. Extruding much below 375° F. will effect melt fracturing in the polymer and extruding much above 475° F. will effect an unwanted and destructive reaction between the constituents and the polymer.

The extruder polymer is cooled and then heated to about 300° F. to be oriented by drawing and thus provide improved tensile strength in the polymer. Ideally, the drawing is undertaken using a ratio of 6:1, but a a range of from about 4:1 to about 8:1 will prove satisfactory. It is understood that varying the draw ratio will vary the tensile strength of the polymer.

The extrusion of this mixture should be accomplished at a temperature not in excess of about 475° F. since above that range an undesirable reaction may take place between the organic bromine compound and the polyolefin which can result in a complete or partial loss of strength in the polymer along with the impairment or lessening of other desirable properties.

It is possible that 475° F. may be exceeded at, or during, extrusion; however, in that event the dispersant(s) within the polymer system must be such that they will prevent the organic bromine compound from collecting to form concentrations of some greater mass within the polymer and thus be in a number of sites of sufficient concentrations to initiate reaction between the bromine of the fire retardant additive and the polyolefin polymer. It is possible that in this event the dispersant selected will be one falling within the definition given earlier as well as one having the ability to pacify this tendency of the bromine of the fire retardant additive to react with the base polyolefin polymer.

As was stated earlier, it is desirable that the polyolefin be in the particulate form, i.e., in powdered or flake form, since in this form the additives are readily dispersed in it. Of the polyolefins, the poly-α-olefins are preferred, i.e., the polyolefins having all of their unsaturation in the alpha position of the monomer. These polymers are characterized by having a configuration such that all of the substituent groups, disregarding hydrogen, lie above or all below the plane of the main chain of the polymer. Examples of these include polyethylene, polypropylene, poly-1-butene and copolymers of these. The most preferable polyolefin for use in this invention is polypropylene because of its very desirable chemical and physical properties.

It is desired that the polyolefin resin be in particulate form, i.e., flake or granular form, since in that physical state it provides maximum surface area. This aids and encourages entry of the mixture of the dispersant and the fire retardant organic bromine compound into the polyolefin resin. Since the organic bromine compound and the polyolefin resin are normally not compatible, some degree of difficulty might otherwise be accomplished insofar as insuring that at least the minimum amount of the fire retardant ingredient is dispersed within the polyolefin resin.

As an alternative, the surface coating of a shaped article of polyolefin may be accomplished; however, proper selection must be made of a dispersant, or of a combination of dispersants, which will aid the entry of at least the minimum quantity of fire retardant ingredients within the polymer or at least within the immediate surface area of the polymer. Of course, this problem is avoided if the fire retardant additive is simply coated on the surface of the article, if it penetrates the surface an amount only sufficient to permit it to become adhered to the polyolefin article and thus provides a relatively permanent protective coating.

My co-pending application Ser. No. 341,614 discloses and claims a polyolefin composition which possesses greatly improved resistance to degradation on exposure to sunlight and weathering. In keeping with that invention, a system of certain selected stabilizers in amounts between about 0.1% and about 9% by weight, based on the weight of the total polymer composition, may be added to the composition of this invention to enhance the polymer by providing greatly improved resistance to weathering an ultraviolet light degradation. The stabilizers of the system are ultraviolet light absorbers, antioxidants and heat absorbers.

In considering the ultraviolet absorbers, concern is manifested in the portion of the sunlight spectrum, i.e., the ultraviolet energy, which is sufficiently powerful to rupture chemical bonds or, in other words, sufficiently powerful to cause photochemical degradation of the polyolefinic shaped article. In the system of this invention, the ultraviolet absorbers must be limited to those which are compatible with the particular polyolefins defined herein. These are represented by p-octylphenyl salicylate, 2 - hydroxy - 4-n-octoxybenzophenone 2-ethylhexyl-2-cyano-3,3'-diphenyl acrylate; a nickel organic complex AM-101; and tert-butyl salicylate. The ultraviolet absorber may be present in an amount from 0.0% to about 5% by weight in the finished product. When the existence of the effect of the ultraviolet light absorber is desired, from about 0.25% to about 5% by weight are acceptable limitations.

The antioxidants contemplated in the system of this invention must also be compatible with the polyolefins at extrusion temperatures and at service temperatures, i.e., they must be non-exuding, but they must also have sufficient heat stability at extrusion temperature to permit the extrusion of the polyolefin composition. They must also possess color stability such that there is little or no color change during, or after, extrusion or during the reasonable life of the polymer. They must also possess excellent water resistance so that moisture will not leach it from the final product, thereby destroying the tensile strength and oxidation resistance which are desired. These antioxidants must not react with the organic bromine compound in the system of this invention to any significant extent or to the extent that fire retardancy of the end product is diminished to a significant amount. This is influenced by the reactivity of the antioxidant and the amount of it that is present. Representative of antioxidants which fall within this definition are 2,6-di-tertiary-butyl-p-cresol; RA–1093, i.e., dioctadecyl-3,5-di-t-butyl-4-hydroxybenzylphosphonate. "Irganox 565," 858, 1076 and 1093, i.e., 2,4-bis-(n-octylthio)-6-(3,5-di-t-butyl-4-hydroxyanilino) - 1,3,5-triazine; 2,4-bis-(3,5-di-t-butyl-4-hydroxyphenoxy) - 6 - (n-octylthio)-1,3,5-triazine; octadecyl-3-(3,5-di-t-butyl-4-hydroxyphenyl) propionate; and dioctadecyl - 3,5 - di-t-butyl-4-hydroxybenzylphosphate; "Santanox," i.e., 4,4'-thio-bis(3-methyl-6-t-butyl phenol); "Topanol C.A.," a 3:1 condensate of 3-methyl-6-tertiary butyl phenol with Crotonaldehyde, "Nonox WSP" and "Nonox CL" two phenolic antioxidants 2246 and 425 i.e. 2,2'-methylene (bis-4-methyl-6-t-butyl phenol), and 2,2'-methylene (bis-4-ethyl-6-t-butyl phenol); 703 2,6-di-t-butyl - 8-dimethylamino-p-cresol; 2,4,5-tri-hydroxybutyrophenone; and butylated hydroxytoluene.

To perform their function, these antioxidants must be present in amounts sufficient to insure a content of from about 0.05% to about 2% by weight in the final polymer; however, within the more commercial aspects of the present invention the use of from about 0.25% to about 0.5% by weight is contemplated.

The third additive is represented by di-lauryl-thiodipropionate, bi-stearyl-thiodipropionate, or "Steroban 20," a modified polyester of thiodipropionic acid in which 80% of the necessary hydroxyl groups are supplied by neopentyl glycol, and 20% are supplied by stearyl alcohol, in an amount sufficient to provide from about 0.05% to about 2% by weight in the final polymer, with from about 0.1% to about 0.5% by weight being preferred. This particular additive is necessary since it is synergistically reactive with the antioxidant and since it imparts heat stability in the final polyolefinic filament.

Heat stabilizers compatible with the polyolefin and which exhibit good resistance to heat during extrusion may also be added to this system provided they are non-migrating and non-reacting.

It has been stated that the polyolefin shaped articles of this invention are flame retardant. This is established by the following vigorous testing techniques.

The article, i.e., fabric, film, etc., to be tested is held horizontally and a flame is brought in direct contact with that article and that position is maintained for a period of 5 seconds, giving a 5 second ignition period. With the removal of the flame from direct contact with the article, any flame which has been induced must cease to exist by self-extinguishing in a period of less than 2 seconds to be acceptable.

If, however, the article is a single filament, then to measure its suitability for fabric use, the ignition period is lowered to 2 and 3 seconds, measuring the time to extinguish after each period of ignition.

The following rating system has been developed for measuring single filament performance using this test procedure and the average time to extinguish after the 2 and 3 second ignition periods. If the flame continues for from 0 to 1 second after termination of the average 2 and 3 second ignition periods, it is given an "excellent" fire retardancy rating. If the flame continues for from 2 to 5 seconds the filament earns a "Good" rating, and if it continues from 6 to 10 seconds it receives a "Fair" fire retardancy rating: over 10 seconds earns a "Poor" rating.

If the filaments exhibit an "Excellent" fire retardancy rating, it is only necessary that the warp or the fill yarns in a fabric contain these filaments in order that the fabric will exhibit acceptable self-extinguishable properties; however, at the "Good" and "Fair" ratings both the warp and fill yarns must contain the flame retardant filaments of this invention. A fabric composed of filaments in both the warp and fill that have earned only a "Poor" rating is not self-extinguishable.

The invention sought to be patented in a second composition aspect is described as fire retardant after a 30 second ignition period when tested under the provisions and procedures of ASTM test for "Flammability of Rigid Plastics over 0.050 inch in Thickness" defined by the ASTM designation: D635–56T. This second composition aspect is described as residing in the concept of a poly-α-olefin compound having by weight, based on the total weight, from about 85% to about 60% poly-α-olefin, from about 10% to 15% of an organic bromine compound, from about 2% to 20% of a dispersant and from about 0.05% to about 5% of a selected antioxidant.

In this embodiment the composition of this invention is in sheet or molded form of at least 0.050 inch in thickness and the ASTM test given above is utilized to satisfy the fire retardancy requirements.

The organic bromine compound is the same as that defined earlier; however, it must be present in amounts of at least about 10% by weight, based on the total weight, but there must be sufficient bromine in the organic bromine compound to insure that at least about 6.5% elemental bromine is present in order to provide fire retardancy satisfying the above given ASTM test.

The dispersants are as defined earlier, however, for this second composition aspect it is preferred that two or more dispersants be utilized in the system. The minimum total amount of dispersant is 2% by weight, based on the total weight, and when two or more dispersants are present in the system, it is essential that there be at least 0.05% by weight of each. If less than 2% dispersant is present there is insufficient to accomplish the dispersion of the organic bromine and antioxidant compounds.

The preferred presence of at least one other dispersant is to insure that there is no build up of any by-products formed by minor reaction of ingredients during mixing and extrusion of the poly-α-olefin. The formation of by-products due to minor reaction of ingredients is a possibility and, while the amount of by-product formed is very small, it may be sufficient to cause some interference or other detrimental effects in the system of this invention if it is not kept dispersed or solvated by other than the initial dispersant.

Increase of the fire retardance is brought about by the increase in the amount of organic bromine utilized and thus the amount of elemental bromine that must be present to satisfy the aforegiven ASTM test must fall within the range of from about 6.5% to about 10%. The selected antioxidant required to protect basic poly-α-olefin from oxidation, must not react with the organic bromine compound utilized. The antioxidant must be present in an amount of at least 0.5% by weight to about 5% by weight, based on the total weight. Below 0.05% there is insufficient present and above 5% the economics of the situation enter into the consideration since the value of the increased amount of antioxidant diminishes as the cost of the increased amount arises.

The selected antioxidant utilized must be compatible with the system of this invention, i.e., the organic bromine compound, the dispersant and the poly-α-olefin plus any other additives such as pigments, fillers, ultraviolet light stabilizers, etc. The selected antioxidants utilized must also be nonexuding, but they must have sufficient heat stability at extrusion temperature to permit extrusion, casting or molding of the poly-α-olefin composition. They must also possess color stability such that there is little or no color change during, or after, extrusion or during the reasonable life of the polymer. They must also possess excellent water resistance so that moisture will not leach it from the final product, thereby destroying the tensile strength and oxidation resistance which are desired.

The antioxidant used with this second composition aspect of this invention must be one that does not cause significant decomposition of the organic bromine compound, yet it must be active enough to prevent oxidation of the polymer, i.e., the fire retardant poly-α-olefin composition of this second concept. Thus it must be tested to determine its applicability.

To test the applicability of the selected antioxidant to be used in this system, an amount of the antioxidant to be tested and an amount of the aforedefined organic bromine compound in percent by weight ratios equaling the percent by weight ratios of the two ingredients in this invention are thoroughly mixed together and heated to about 125° C. and kept at that temperature for a continuous period of about 24 hours. The organic bromine compound must not undergo an appreciable or significant color change during that time, nor must it give off bromine in other than very minor amounts. It is preferred that no bromine gas is given off and that no color change takes place in the organic bromine compound.

Carbon is an excellent example of an antioxidant that fits the above definition and it acts as a pigment as well. Other representative antioxidants fitting the above definition and filling the above-given requirements are "Irganox 858" and butylated hydroxytoluene sold under the trademark "Ionol", i.e., 2,6-di-t-butyl-4-methyl phenol.

The invention will be further illustrated by the following examples wherein all weights, unless stated otherwise, are given in parts by weight based on the total weight. It should be understood; however, that although these examples may describe, in particular detail, some of the more specific features of the invention, they are given primarily for purposes of illustration and the invention in its broader aspects is not to be construed as limited by the following examples.

Example I

A polypropylene monofilament is prepared by adding 13 parts of Phosgard, B–52–RS, to 87 parts of Profax 6623, a polypropylene in flake form. The mixture is thoroughly agitated for from 10 to 15 seconds or more to insure a substantially homogeneous distribution and added to the hopper of a 24:1 L/D 1" extruder equipped with a 4:1 compression screw and a 60–40 screen pack. (This specific extruder will hereinafter be referred to simply as the 1" extruder.) The temperature of the screw section and that of the die assembly are set at 400° F. and the monofilaments extruded from the above-described mixture are of poor quality in that they break repeatedly and filament fibrillation is in evidence. Exudation occurs when the filaments extruded are stored for a period of time. Even with their poor quality, insofar as their textile characteristics are concerned, testing for fire retardancy earns a "Good" rating for the filament.

Example II

Following the teachings of co-pending applications Ser. Nos. 341,613 (now abandoned) and 341,614, an ultraviolet and weathering retardant system containing a dispersant meeting the requisites for the dispersant required in this invention is prepared by mixing together 3.7 parts DLTP[1], 7.4 parts Ionol, 14.8 parts OPS[2] and 74.1 parts Arochlor 1260 a chlorinated biphenyl containing an average of 60% chlorination which shall hereinafter be referred to as the L–1 formulation. This mixture is heated to 150° F. to dissolve the solid constituents.

13 parts of the L–1 solution is added to 87 parts of Profax 6501, a polypropylene in flake form and after 10 to 15 seconds of agitation the procedure of Example I is repeated. The extrusion is good and monofilaments having a good appearance but "Poor" fire retardancy resulted.

Example III

Following the procedure of Example II, the L–1 formulation is prepared containing the ultraviolet and weathering retardants plus a dispersant required of this invention. 10 parts of the L–1 formulation in solution form are mixed with 5 parts Phosgard B–52–RS and this composite solution is added to 85 parts of Profax 6623 flake polypropylene. The mixture is thoroughly mixed for about 15 seconds and fed into the hopper of the 1" extruder described in Example I and extruded with the temperature of the screw assembly and the die assembly set at about 400° F. The monofilaments extruded were of good to excellent textile quality with no breakage or fibrillation in evidence. The results of the fire retardancy test earn the monofilament a "Good" rating and filament storage provides no evidence of exudation.

A sample of the monofilament is exposed to the equivalent of 6 to 9 months' exposure to Florida sun and weathering with excellent results and little appreciable damage to the filaments due to sunlight and general weathering.

Example IV

A mixture of 7.5 parts of B–52–RS and 10 parts of Chlorowax "70," are blended together and added to 82.5 parts of Profax 6623, flake form polypropylene and the composite is thoroughly mixed to provide a homogeneous dispersion of ingredients. This composite is fed into the hopper of the 1" extruder and a monofilament is formed following the extrusion procedure of Example I. The extrusion is good and textile-acceptable monofilaments are produced. Following the test procedure given earlier, the fire retardancy of these monofilaments is tested with the resultant rating of "Good."

Example V

A monofilament is prepared by combining 0.5 part of stearic acid with 10 parts of T23P, i.e., Firemaster T23P, which is the compound tris-2,3-dibromopropyl phosphate and adding 89.5 parts of Profax 6501, a polypropylene in flake form. The composite is mixed enough to distribute the ingredients and the extrusion procedure of Example I is followed to produce a textile-acceptable monofilament. Extrusion is excellent and fire retardancy testing of the monofilament provides an "Excellent" rating.

Example VI 0.5 part of double pressed stearic acid and 10 parts of Firemaster T23P are mixed together and the mixture is heated to 150° F. to dissolve the stearic acid and then cooled to room temperature. The resultant paste of stearic acid/T23P is added to 83.5 parts of Profax 6501 flake polypropylene in a Hobart reed mixer using slow speed and the composite is blended for about 10 to 30 seconds or until the paste is substantially uniformly distributed throughout the resin. 6 parts of black pigment in pellet form, i.e., black concentrate sold under the trademark D1921, i.e., carbon black, is added and the mixing is continued for several seconds, but only to the extent necessary to distribute the pigment. Overmixing will wet the individual particles, reducing the free-flowing property of the resin blend. A good free-flowing feed to the extruder is desirable in order to achieve a uniform extrusion without feed interruption as a result of bridging in the hopper.

The resin blend is added to the hopper of a 24:1, L/D extruder equipped with a 4:1 compression screw and a ---
[1] DLTDP is di-lauryl thiodipropionate.
[2] OPS is p-octylphenyl salicylate.

60–40 screen pack. It is desirable that all parts be either chrome plated or constructed of non-reactive metals to minimize reaction in the extruder. The temperatures in the screw section and in the die assembly are set at 400° F.

Using a 1" extruder with a die opening of 0.045", the resin blend is extruded at a rate of 33.5 feet per minute, quenched in water at room temperature, and oriented under infrared (at about 300° F.) at a ratio of 6:1 to produce 13.3 mil filaments which have a tensile of about 59,000 p.s.i. These filaments are woven (both warp and fill) into an open mesh fabric with a count of 20" x 26". The fabric so produced is very difficult to ignite within a five second period of time and, if ignition is effected, it extinguishes itself within two seconds.

Example VII 23.1 parts of Arochlor 1268 (chlorinated biphenyl), 0.23 part double pressed stearic acid and 7.7 parts of Firemaster T23P (tris-2,3-dibromopropyl phosphate) are mixed and this mixture is heated to about 150° F. to dissolve the solids and evenly distribute the constituent parts. The mixture is cooled to room temperature and added to about 68.1 parts of Profax 6501 flake polypropylene in a Hobart reed mixer using slow speed. The mixer is stirred for only sufficient time to provide uniform distribution of constituents and thus avoid destroying the free-flowing properties of the resultant resin blend.

The resin blend is added to the hopper of a 1" extruder and the extrusion procedure of Example VI is followed under the conditions given there. Extrusion is uneventful and the resultant filaments are tested for fire

Example VIII 5 parts chorendix anhydride, 1 part stearic acid and 10 parts Firemaster T23P are mixed, heated to about 150° F. to dissolve the solids, and added to 79 parts of Profax 6501, flake polypropylene and the procedure of Example VI is followed using 6 parts of black concentrate D1921; however, the resultant filaments are not fashioned into a fabric.

Extrusion is good and fire retardancy testing of the filaments provide a "Fair" rating.

Example IX 84 parts of Arochlor 1260, 3 parts DLTDP, 3 parts Ionol and 10 parts U.V. 531 are mixed to provide a system (hereinafter referred to as the L-4 system) to retard ultraviolet light degradation and impart weathering resistance as taught in co-pending application Ser. No. 341,614.

3.6 parts of the above-described ultraviolet weathering preventative, i.e., the L-4 system, is mixed with 10 parts Firemaster T23P (tris-2,3-dibromopropyl phosphate) and the procedure of Example VI is followed using 4 parts black concentrate D1921 and 82.4 parts Profax 6501, flake polypropylene. Extrusion is uneventful and the resultant filaments are tested for fire retardancy and given a "Good" rating. The filaments are tested by exposure to the equivalent of 36 months of Florida sun and the results are satisfactory with an acceptable loss in physical properties for that period of exposure.

Example X 1 part stearic acid is mixed with 3 parts Firemaster T23P, and heated to 150° F. to dissolve the stearic acid; then cooled to room temperature which forms a paste which is added to 90 parts of Profax 6501, flake polypropylene. The resultant mixture is added to a Hobart reed mixer and blended for about 10 to 30 seconds and including 6 parts of black concentrate D1921.

The resin blend is extruded under the conditions and following the procedure of Example VI. Extrusion is good but fire retardancy testing of the filaments produced earned only a "Poor" rating.

Example XI

The procedure of Example IX is followed except that 9.4 of the L-4 system for prevention of ultraviolet degradation and weathering is mixed with 7.4 parts Firemaster T23P and this composite is, in turn, added to 83.2 parts Profax 6501, flake polypropylene. There is no pigment added to the system.

Extrusion is good and testing of the filaments for fire retardancy develops an "Excellent" rating. The filaments are tested for ultraviolet degradation and weathering, and after about 8 month's exposure to Florida sun and weather they exhibit acceptable loss in properties due to the effects of U.V. degradation and weathering.

A fabric is woven using the above-produced filament of this invention in the fill and normal polypropylene filaments in the warp which are tested for fire retardancy and found acceptable.

Example XII

A film is produced by mixing 0.5 part of double pressed stearic acid with 1 part of Firemaster T23P and heating to about 150° F. to dissolve the stearic acid resulting in a true solution. After cooling to about room temperature a paste is formed which is blended with 98.5 parts of Profax 6501 flake resin in a Hobart reed mixer. Mixing time is limited to 30 seconds or less to prevent wetting of all individual particles which would substantially reduce free-flowing properties.

The mixture is placed in the hopper on the 1" extruder fitted with a 6" slit die and the exudate from the die quenched on a water cooled chrome plated roll. Temperature of screw and die assembly is maintained at 400° F.

No difficulty is encountered in extruding a 7 mil thick film which self extinguishes in 1 to 4 seconds when ignited for a five second period.

Example XIII

Pressed films are best produced from the pelletized composition which is prepared by mixing 0.5 part of double pressed stearic acid with 10 parts of Firemaster T23P and heating to 150° F. to dissolve the stearic acid providing a clear solution. After cooling to approximately (80° F.) room temperature, a paste is formed which is blended with 83.5 parts of Profax 6501 flake resin and 6 parts of black concentrate pellets D1921, supplied by Imperial Color and Chemical Company, using a Hobart reed mixer. Mixing time is limited to 10 to 30 seconds to prevent wetting of individual particles which would substantially reduce free-flowing properties.

The blended resin is placed in the hopper of the 1" extruder and extruded into .045" diameter or larger filaments which are not oriented but are later cut into approximately ½" lengths. Temperatures during extrusion are maintained at 400° F. This pelletized composition is used to press films or can be extruded into other objects or forms.

Pressed films are readily prepared from the pelletized composition by placing a quantity of the material between two pieces of Teflon coated fiberglass release fabric and placing this between the platens of a Pasadena press. The film is formed with a platen pressure of 10,000 lbs. and platen temperature of 370° F.–380° F. using shims between the platens to get the desired film thickness. After a dwell time of 10–30 seconds the platens are separated and the film, still sandwiched between the release cloths, is removed and permitted to cool; when cool, the release cloths are removed.

The films produced earned a "Good" fire resistance rating when subjected to an open flame for 5 seconds. In such a test, 8 and 25 mil thick films, ½" wide, self extinguished in less than 3 seconds.

Example XIV

A monofilament is prepared by adding directly to 82.5 parts of Profax flake resin in the Hobart reed mixer 10.0 parts powdered Chlorowax 70, a chlorinated paraffin containing 70% chlorine by weight and having a melting point range of 95–110° C. After thoroughly mixing for several minutes, 7.5 parts of warm (150° F.) Firemaster T23P is added and blending continued for no more than 30 seconds to prevent wetting of the individual particles and thereby reducing free-flowing properties of the blend.

The resin blend is charged in the hopper of the 1″ extruder and extruded into textile grade monofilaments as described in Example VI.

The filaments thus produced are a good textile quality and earn an "Excellent" fire resistance rating.

Example XV

A monofilament is prepared by preheating about 88 parts by weight of Profax 6623 flake polypropylene to a temperature of about 150° F. 0.05 part of Irganox 858 antioxidant, 0.5 part stearic acid, 1.5 parts Arochlor 1260 and 10 parts of Firemaster T23P organic bromine are mixed together at a temperature of about 150° F. in a separate container and this mixture is added to the preheated flake polypropylene. The composite mixture is thoroughly agitated and mixed to insure substantially uniform absorption of the additives into the polyolefin resin and to provide a free-flowing blend.

The resin blend is charged into the hopper of a 1″ extruder and extruded into film. Following the procedure of Example XIII, a film ½″ wide and 5″ long was prepared. These films or sheets were 0.050 inch thick.

The film thus produced was tested following the procedure defined by ASTM D635–56T and were determined to be fire retardant after the 30 second ignition period described therein.

Example XVI

Following the procedure of Example XV, a second sheet or film 0.05 inch thick, 0.5 inch wide and 5 inches long was prepared but utilizing as the antioxidant 5 parts Ionol, 0.5 part DLTDP as a heat stabilizer, 0.5 part stearic acid and 19.5 parts Arochlor 1260 and 15% T23P. The polyolefin flake was present in about 59.5 parts (all parts being parts by weight). The sheet was fire retardant as tested by ASTM test D635–56T.

Example XVII

The procedure of Example XV was repeated utilizing the same constituents except that polyethylene powder was substituted for the flake polypropylene. The film or sheet produced was tested utilizing the test procedures of ASTM test D635–56T and passed the test, exhibiting fire retardancy after a 30 second ignition period.

It will be apparent that many widely different embodiments of this invention may be made without departing from the spirit and scope thereof, and therefore it is not intended to be limited except as indicated in the appended claims.

I claim:

1. A fire retardant poly-α-olefin composition comprising a union of a poly-α-olefin with a mixture of sufficient poly-α-olefin non-compatible organic bromine phosphate compound to insure at least about 0.7% by weight elemental bromine in said poly-α-olefin composition and a dispersant for said bromine compound, where the organic bromine phosphate is dispersed substantially uniformly within said poly-α-olefin mixture and where the organic bromine phosphate is defined by being substantially thermally stable when held at a temperature of about 125° C. for a continuous period of about twenty-four hours.

2. The fire retardant poly-α-olefin composition of claim 1 wherein sufficient organic bromine phosphate is present to insure at least about 2% by weight elemental bromine in said final poly-α-olefin composition.

3. A film having a composition derived from a union of a poly-α-olefin resin with a mixture of sufficient poly-α-olefin non-compatible organic bromine phosphate compound to insure at least about 0.7% by weight elemental bromine in said film and from about 0.05% to about 20% by weight of a dispersant for said bromine compound where said organic bromine phosphate is defined by being substantially thermally stable when held at a temperature of about 125° C. for a continuous period of about twenty-four hours.

4. A shaped article comprising a poly-α-olefin selected from the group consisting of polyethylene, polypropylene, poly-1-butene and copolymers thereof, having substantially uniformly dispersed therein sufficient non-poly-α-olefin compatible organic bromine phosphate compound to insure at least about 2% by weight elemental bromine in said shaped article and from about 0.05% to about 20% by weight of a dispersant for said compound, where said organic bromine phosphate is defined by being substantially thermally stable when held at a temperature of about 125° C. for a continuous period of about twenty-four hours, and where said shaped article exhibits acceptable fire retardancy.

5. The article of claim 4, wherein said dispersant is selected from the group consisting of chlorinated biphenyl and triphenyl compounds containing from about 20% to about 70% by weight chlorine, stearic acid, and combinations thereof.

6. The article of claim 4 wherein said organic bromine phosphate is selected from the group consisting of:

(a) 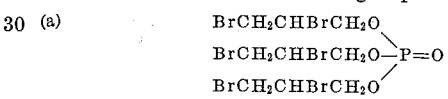

and (b) 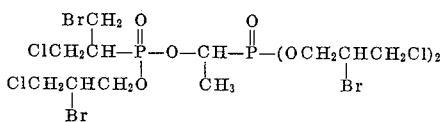

7. The article of claim 4 wherein there is sufficient of said organic bromine phosphate to insure at least about 5% by weight elemental bromine.

8. The article of claim 4 wherein there is sufficient of said organic bromine phosphate to insure at least about 10% by weight elemental bromine.

9. A fire retardant poly-α-olefin filament comprising a union of a poly-α-olefin with a mixture of sufficient poly-α-olefin non-compatible organic bromine phosphate compound to insure at least about 2% by weight elemental bromine in said filament, and from about 0.05% to about 20% by weight of a dispersant for said bromine compound, where said bromine compound is defined by being substantially thermally stable when held at a temperature of about 125° C. for a continuous period of about twenty-four hours.

10. The filament of claim 9 wherein said organic bromine phosphate is selected from the group consisting of:

(a) 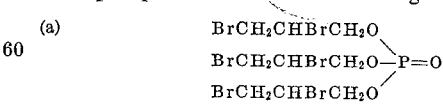

and (b) 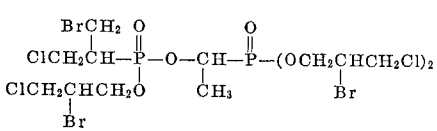

and said poly-α-olefin is selected from polypropylene, polyethylene, poly-1-butene and copolymers thereof.

11. The filament of claim 9 wherein there is sufficient of said organic bromine phosphate present to insure at least about 5% elemental bromine.

12. The filament of claim 9 wherein there is sufficient of said organic bromine phosphate present to insure at least about 10% elemental bromine.

13. A stabilized, fire retardant poly-α-olefin shaped article of manufacture comprising a poly-α-olefin having substantially uniformly dispersed therein sufficient poly-α-olefin non-compatible organic bromine phosphate to insure at least about 0.7% by weight elemental bromine in said shaped article, said bromine compound defined by being substantially thermally stable when held at a temperature of about 125° C. for a continuous period of about twenty-four hours, from about 0.05% to about 20% by weight of a dispersant for said bromine compound and at least one stabilizer selected from the groups consisting of (1) from about 0.05% to about 2% by weight of an antioxidant selected from hindered phenols separately or in combination with sulfides, (2) from about 0.25% to about 5% by weight of an ultraviolet light absorber selected from substituted benzophenones, salicylates, benzotriazoles, substituted acrylonitriles, nickel organic compounds, carbon and titanium dioxide separately or in combination, and (3) from about 0.05% to about 2% by weight of a member selected from di-lauryl-thiodipropionate, di-stearyl-thiodipropionate and a modified polyester of thiodipropionic acid.

14. The shaped article of claim 13 wherein sufficient of said organic bromine phosphate is present to insure at least about 2% by weight elemental bromine in said shaped article.

15. The article of claim 13 wherein said groups consist of (1) from about 0.25% to about 0.5% by weight of an antioxidant selected from hindered phenols separately or in combination with sulfides, (2) from about 0.25% to about 5% by weight of an ultraviolet light absorber selected from substituted benzophenones, salicylates, benzotriazoles, substituted acrylonitriles, nickel organic compounds, carbon and titanium dioxide separately or in combination, and (3) from about 0.1% to about 0.5% by weight of a member selected from di-lauryl-thiodipropionate, di-stearyl-thiodipropionate and a modified polyester of thiodipropionic acid.

16. The method for extruding a fire retardant poly-α-olefin filament which comprises:
(a) thoroughly mixing together from about 3% to about 12% by weight of a poly-α-olefin non-compatible organic bromine phosphate compound to insure at least about 0.7% elemental bromine in said filament, said bromine compound defined by being thermally stable when held at a temperature of about 125° C. for a continuous period of about twenty-four hours, and from about 0.05% to about 20% by weight of a dispersant for said bromine compound with from about 68% to about 97% of a poly-α-olefin resin, and
(b) adding said mixture to an extruder and extruding at a temperature of from about 350° F. to about 475° F.

References Cited

UNITED STATES PATENTS

| | | | |
|---|---|---|---|
| 2,268,501 | 12/1941 | Bradley | 260—759 |
| 2,480,298 | 8/1949 | Happoldt | 260—28.5 |
| 2,669,521 | 2/1954 | Bierly | 106—15 |
| 2,993,019 | 7/1961 | Snyder | 260—28.5 |
| 3,098,697 | 7/1963 | Cappuccio et al. | 260—897 |
| 3,216,960 | 11/1965 | Monroe | 260—28.5 |
| 3,250,739 | 5/1966 | Sauer et al. | 260—45.75 |
| 3,275,715 | 9/1966 | O'Leary | 260—889 |
| 3,277,046 | 10/1966 | Listner | 260—45.85 |
| 3,326,832 | 6/1967 | Rauschenbach et al. | 260—28.5 |

OTHER REFERENCES

"Compounding Ingredients for Rubber," 3rd ed., 1961, pp. 86 and 243, TS–1890–I–53.

DONALD E. CZAJA, *Primary Examiner.*

R. A. WHITE, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,403,118 September 24, 1968

Gregory Julius Listner

It is certified that error appears in the above identified patent and that said Letters Patent are hereby corrected as shown below:

Column 10, line 2, after "Chlorowax 70" insert -- a chlorinated paraffin containing 70% chlorine by weight and having a melting point range of 95-110° C. --. Column 11, line 32, after "fire" insert -- retardancy and exhibit a "Good" rating --.

Signed and sealed this 10th day of February 1970.

(SEAL)
Attest:

Edward M. Fletcher, Jr.
Attesting Officer

WILLIAM E. SCHUYLER, JR.
Commissioner of Patents